United States Patent
Von Holdt

[15] 3,642,417
[45] Feb. 15, 1972

[54] RELEASE APPARATUS FOR DIECASTING ASSEMBLY

[72] Inventor: John W. Von Holdt, 7430 N. Croname Road, Niles, Ill. 60648

[22] Filed: Apr. 29, 1970

[21] Appl. No.: 32,910

[52] U.S. Cl..................425/443, 425/DIG. 51, 425/DIG. 58, 425/444
[51] Int. Cl............................................................B29c 7/00
[58] Field of Search...............249/67, 68; 18/2 RP, 30 WN, 18/42 D, DIG. 14, DIG. 51, DIG. 58

[56] References Cited

UNITED STATES PATENTS

| | | |
|---|---|---|
| 3,208,113 | 9/1965 | Bennett...........................425/DIG. 51 |
| 3,172,927 | 3/1965 | Mojonnier......................425/DIG. 58 |
| 3,125,801 | 3/1964 | Fields...................................425/443 |
| 3,373,460 | 3/1968 | Ladney.........................425/DIG. 58 |

Primary Examiner—H. A. Kilby, Jr.
Attorney—Gary, Parker, Juettner, Pigott & Cullinan

[57] ABSTRACT

An improved release device for a diecasting assembly including a flexible pin one end of which is moved in a first direction parallel to the direction of die movement while the opposite end thereof is guided for movement along a path inclined to said first direction, the inclined movement of said opposite end of said pin serving to effect release of a plastic part subsequent to a diecasting operation.

4 Claims, 5 Drawing Figures

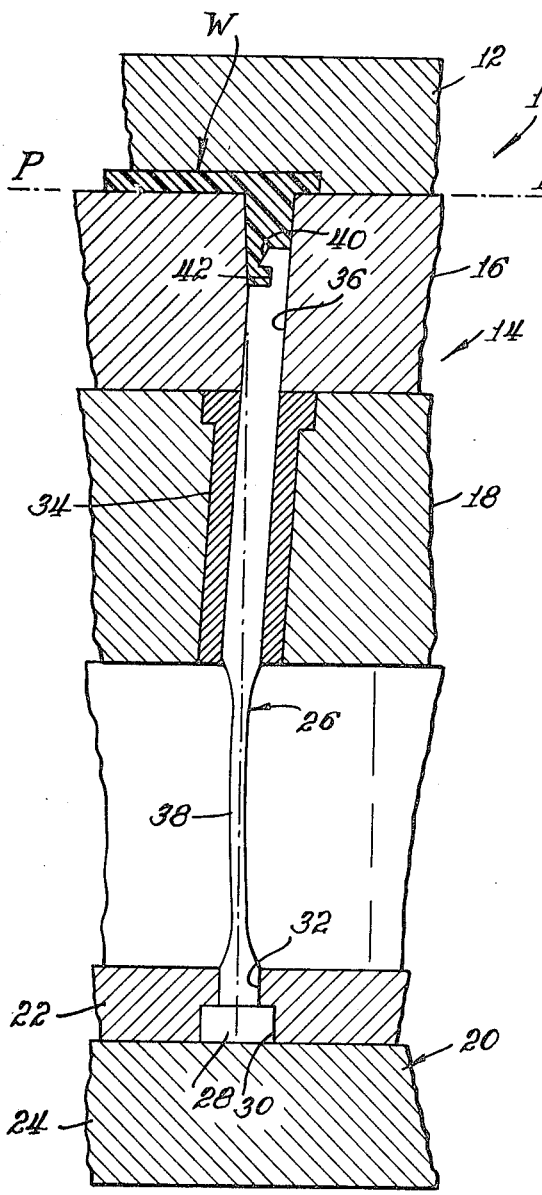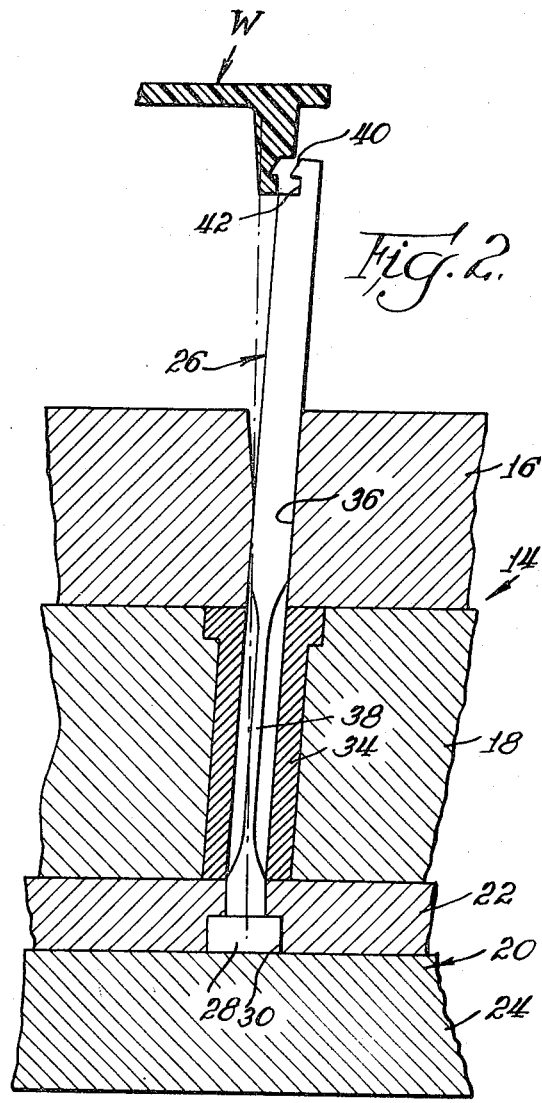

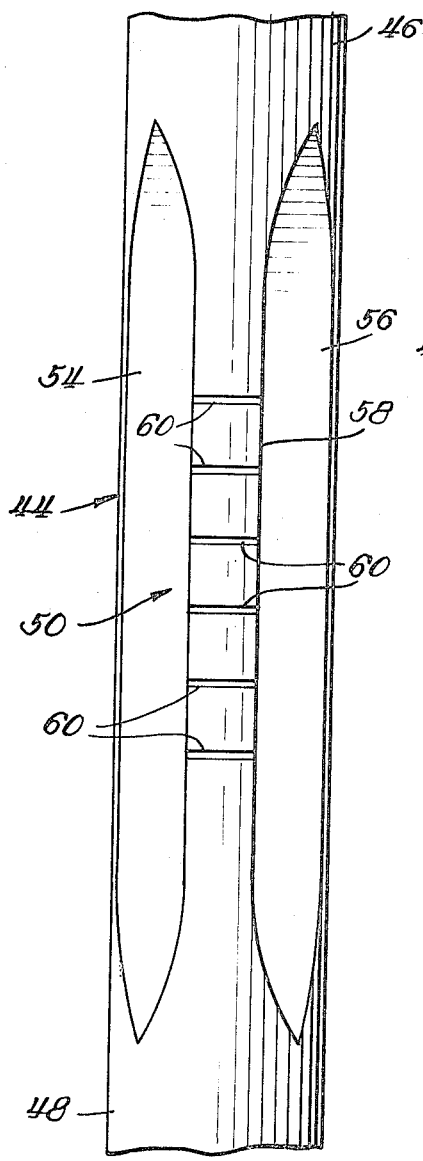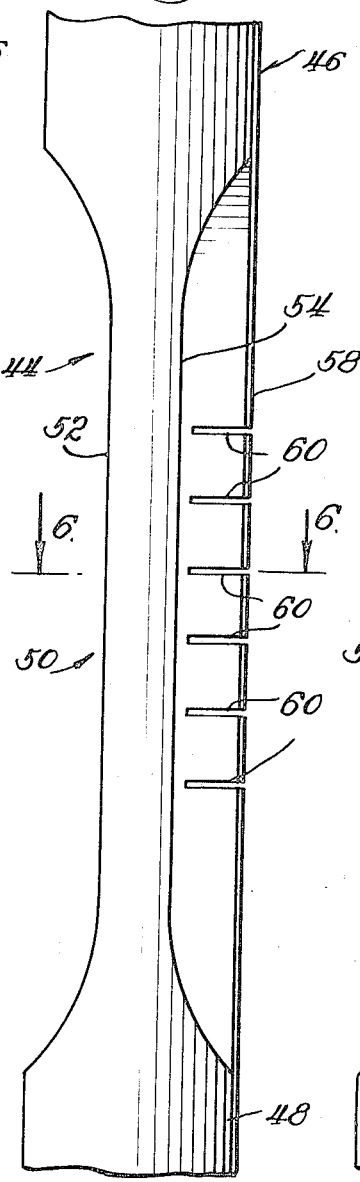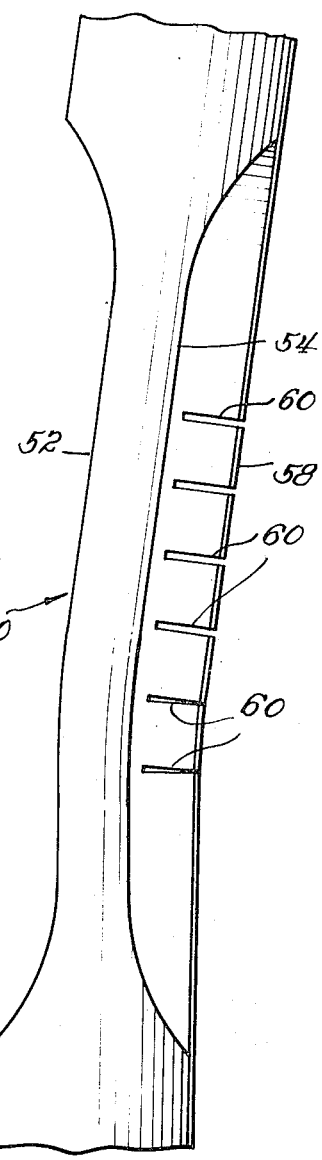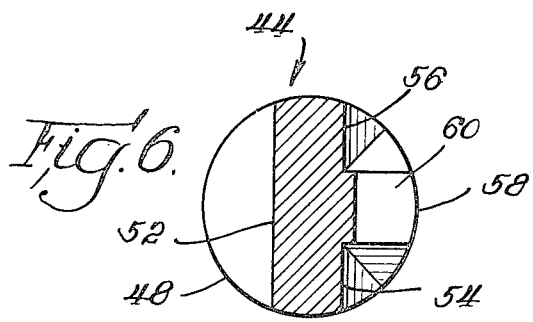

3,642,417

RELEASE APPARATUS FOR DIECASTING ASSEMBLY

BRIEF SUMMARY OF THE INVENTION

The present invention relates to diecasting apparatus comprising two half sections of a die which when in their closed positions define a space for molten plastic material to flow thereby to form a plastic part of desired shape, after which the die sections are separated, and in accordance with the design of the die sections are separated, and in accordance with the two die sections and must of course be removed therefrom.

A common procedure for automatically ejecting a cast plastic part from a die section on which it is carried comprises the use of a plurality of knockout pins which force the plastic part away from the die section and release the same. Such pins are moved through openings in the die section so as to abut against portions of the plastic part and push the same away from the face of the die section so that the part will fall away into a hopper or the like. However, while the foregoing known apparatus will function in many applications, substantially more complicated release apparatus has heretofore been required where the plastic part has undercuts or the like. For example, where the plastic part has undercuts formed thereon, such as a plurality of legs with hook members formed on the ends thereof, such hook members will in effect interlock the plastic part with the die section, in which case the die must either collapse or open up in some fashion in order to release the part and permit the ejection thereof.

The conventional apparatus for releasing a plastic part having undercut portions formed thereon comprises as a component of the die section a movable member guided for movement along a path which is inclined to the path of movement or axis of the die itself, and the undercut which is required in the plastic part is formed in such movable member. Consequently, when the part is to be ejected, the movable member is in effect opened up by movement thereof along the inclined path thereby causing the projecting or hook portion of the movable die component to disengage itself from the complementary projecting or hook portion of the part so as to release the latter and permit its ejection.

In the foregoing known apparatus, it will be understood that means must be provided for actuating the movable element of the die along its inclined path. In order to accomplish this function a pusher or actuating pin is used which moves through an opening in the die section in a direction parallel to the direction of die movement as in the case of a conventional knockout pin. However, it will be understood that because the movable die component must move along an inclined path, it is necessary to provide a tongue and groove connection or the like between the actuating pin and the movable die component so as to accommodate the lateral shifting of the die component as the latter is moved along its inclined path. Accordingly, the movable die component having the undercut formed therein must be fairly large in order that it may contain a groove or slot sufficient to receive the end of the actuating pin so as to permit relative lateral movement therebetween. It will further be noted that with such an arrangement limitations are imposed on the distance that the pusher or actuating pin and the die component can move for the reason that such movement must stop where the relative lateral shifting of the die member relative to the actuating pin causes the pin to reach the end of the aforementioned groove or slot in the die member.

It is a general object of the present invention to provide an improved form of release mechanism for a diecasting assembly for use in those applications where the plastic part to be formed has undercuts or the like thereby necessitating a collapsing or opening of the die in order to release and eject the part.

A more specific object is to provide release mechanism as last above-mentioned comprising a flexible knockout pin mounted in such a manner that the rear end thereof is movable parallel to the direction of die movement while the opposite or forward end thereof having an undercut or the like formed thereon is guided for movement along a path inclined to the axis or direction of movement of the die.

The foregoing and other objects and advantages of the invention will be apparent from the following description of certain preferred embodiments thereof, taken in conjunction with the accompanying drawings.

DESCRIPTION OF THE DRAWINGS

FIG. 1 is a fragmentary sectional view of a die assembly embodying release mechanism constructed in accordance with the present invention, the die being shown in closed position and a formed plastic part being shown in the die cavity;

FIG. 2 is a view similar to FIG. 1 showing the lower half of the die separated from the upper half (not shown) and showing the release mechanism in its actuated position to release the part;

FIGS. 3–5 are enlarged fragmentary elevational views showing an alternative form of flexible release pin; and FIG. 6 is a sectional view taken substantially along the line 6—6 of FIG. 4.

Now, in order to acquaint those skilled in the art with the manner of making and using my invention, I shall describe, in conjunction with the accompanying drawings, certain preferred embodiments of my invention.

DETAILED DESCRIPTION OF THE INVENTION

Referring now to the drawings, there is shown a die casting assembly 10 comprising an upper die section 12 and a lower die section 14. In the embodiment being described, the upper half of the die 12 is stationary, while the lower half 14 is movable downwardly (as viewed in FIG. 1) in order to open the die at a parting line P. The lower half 14 of the die assembly includes two die block members 16 and 18 which are secured together, and a knockout pin block 20 comprised of two plate members 22 and 24 which are rigidly secured to one another by any conventional means.

It will be understood that the entire lower half 14 of the die assembly including the die blocks 16 and 18 and the knockout pin block 20 is movable away from the stationary upper half 12 of the die, i.e., downwardly as viewed in FIG. 1, in order to open the die cavity. It will further be understood that the knockout pin block 20 is normally spaced from the die block member 18 as shown in FIG. 1, such spacing being maintained by yieldable spring means or the like (not shown), but the block member 20 is movable into engagement with the die block member 18 as shown in FIG. 2. Such movement of the lower half of the die 14, and relative movement of the knockout pin block member 20, is well known in the art, and thus a more detailed description thereof is not believed necessary for purposes of describing the present invention.

In accordance with the present invention, a flexible knockout pin 26 is provided having one end anchored to the block 20 for movement therewith in the direction of die movement. The pin 26 extends through the plate member 22 and has an enlarged head 28 formed thereon which seats in a counterbore 30 formed in the bottom of the plate 22. It will thus be understood that by passing the pin 26 through the opening 32 in the plate 22 until the head 28 is seated in the counterbore 30, and by securing the plate 22 to the plate member 24 by any conventional means, the lower end of the pin 26 will be anchored to the block 20 for conjoint movement therewith.

The die block member 18 has an opening formed therein in which is mounted a bushing 34 having an inner diameter dimensioned to receive the pin 26 and permit sliding movement thereof. It is important to note that the axis of the bushing 34 is inclined relative to the axis of the die assembly 10, i.e., the direction of die movement. Thus, when the block member 20 is moved from the position of FIG. 1 to the position of FIG. 2, the block 20 moves along a path parallel to the axis of the die assembly, i.e., upwardly as viewed in FIGS. 1 and 2, whereas the axis of the bushing 34 is inclined relative to the axis of the die assembly.

The die block member 16 is also provided with an opening 36 which is coaxial with the inclined bushing member 34 and which accommodates sliding movement of the pin 26. Consequently, when the block member 20 moves from the position of FIG. 1 to the position of FIG. 2, the lower end of the pin 26 having the head 28 formed thereon will move with the block member 20 along a path parallel to the axis of the die assembly, while the opposite end of the pin will move along an inclined path as determined by the axis of the bushing 34 and hole 36, thereby causing flexing of the pin member 26. The knockout pin 26 is designed to accommodate the necessary deflection thereof. Thus, in the embodiment shown in FIGs. 1 and 2, the pin 26 is formed with a reduced section 38 which readily permits the pin to deflect in the aforesaid manner.

It will be noted that the upper end of the pin 26 is formed with a projecting hook portion 40 adjacent to which is formed an undercut 42, and it will further be noted that on the plastic part or workpiece W there is formed a complementary hook member with an adjacent undercut thereon. It is a feature of the present invention that the end of the flexible knockout pin is shaped to produce the desired undercut shape on the plastic part to be formed, and in accordance with the invention it is the movement of the pin along an inclined path during a release operation which permits the disengaging of the pin from the part W.

In operation, the die assembly 10 is initially closed as shown in FIG. 1, and the molten plastic is injected into the die cavity to form the plastic part as shown at W. The lower half of the die 14 is then moved away from the upper half 12, and at a given point in such movement the block member 20 will engage a conventional stop (not shown), whereby continued movement of the lower half 14 of the die will overcome yieldable spring means or the like (not shown) and cause the block 20 to be moved upwardly into engagement with the die block member 18 as shown in FIG. 2.

Such movement of the block 20 relative to the die block members 16 and 18 will move the knockout pin 26 to its release position as shown in FIG. 2. Moreover, because the upper end of the pin 26 is guided for movement along an inclined path, the projection 40 formed on the end of the pin will gradually disengage from the plastic part W. Thus, as the pin 26 moves toward its release position, in conjunction with one or more other like pins (not shown), the pins 26 will carry the part W with them thereby separating the part W from the die block 16, and as the pins continue their movement along their respective inclined paths, the hook members 40 will ultimately disengage from the part W and permit the latter to fall into a hopper or the like.

It should be understood that numerous diecasting applications require that the plastic part have various undercut portions thereon, one of many examples being where a clock housing is formed in two sections having hook portions thereon in order to permit the sections to be snapped together during assembly. In most such applications, particularly where the element in which the undercut is to be formed is not unduly large, the desired undercut may be formed on the end of a flexible knockout pin in accordance with the present invention, thereby eliminating the substantially more complex and expensive use of a knockout or actuator pin in combination with a movable die element connected to the actuator pin by a tongue and groove connection or the like.

Thus, the flexible knockout pin of the present invention will replace two or more conventional components and greatly simplify the construction of the die assembly without in any way sacrificing the ability of the die to release plastic parts having undercuts thereon. It will of course be understood that any desired number of flexible pins constructed in accordance with the present invention may be utilized in a given die assembly and arranged in various ways depending upon the particular application.

Reference is now made to FIGS. 3–6 which show an alternative form of knockout pin 44. The pin 44 is round in its cross-sectional configuration at the two end portions thereof as shown at 46 and 48, and intermediate such end portions there is provided a generally T-shaped section 50 of increased flexibility, as best illustrated in FIG. 5 which shows the pin 44 in a deformed position.

At one side of the T-shaped pin section 50, a flat recessed surface 52 is milled or otherwise formed thereon as best shown in FIGS. 4–6 thereby reducing the rigidity of the pin in that area. On the opposite side of the pin, two generally similar flat surfaces 54 and 56 are milled or otherwise formed thereon, the surfaces 54 and 56 being spaced apart so as to leave a rib 58 therebetween. A plurality of transverse slots 60 are cut into the rib 58 so as to further accommodate flexing of the pin 44 in a direction which tends to close the slots 60, i.e., in the direction shown in FIG. 5.

The purpose in the foregoing flexible pin design is to provide a pin which tends to be quite flexible until a predetermined amount of deflection has occurred, and which thereafter becomes more rigid. Thus, in any particular application of the present invention to a die assembly, it can be determined in advance the amount of deflection of the knockout pin which will be required during a release operation. If it be assumed for example that the required deflection of the pin will be 15 degrees, then it may be advantageous to provide a pin which will deflect readily up to 15° and then become more rigid. The pin design of FIGS. 3–6 accomplishes this objective since the pin 44 will become more rigid after it has deflected an amount sufficient to close the transverse slots 60 formed in the rib member 58.

One useful procedure for setting the slot openings 60 to close at the proper deflection angle is to deflect the pin as shown in FIG. 4 so as to cause it to assume the desired angle of maximum deflection e.g., 15°, and if the slots have not closed completely then it is possible to position a steel block against the slots and by hitting the block with a hammer cause all of the slots to be deformed into closed and locked positions. The slots will open when the pin is allowed to return to its normal straight position, but thereafter the slots will be fully closed and locked when the pin is again deflected to the predetermined position of desired maximum deflection.

The term "diecasting" as used herein and in the appended claims is intended to be synonymous with mold or plastic mold so as to refer to a mold assembly used for the molding of plastic parts.

While I have described my invention in certain preferred forms, modifications within the scope of my invention will readily occur to those skilled in the art, particularly with my disclosure before them.

I claim:

1. In a die casting assembly for making plastic parts of a type having one or more undercuts formed therein, release mechanism comprising, in combination, a die section designed to carry a formed plastic part after opening of the die assembly, an opening extending through said die section in communication with a die cavity, said opening being inclined to the direction of die movement, a knockout pin block normally positioned in spaced relation to the rear face of said die section and movable toward said face in the direction of die movement during a release operation, a flexible knockout pin slidably mounted in said inclined opening and having its rear end anchored to said knockout pin block for conjoint movement therewith in the direction of die movement thereby causing deflection of said knockout pin, and a projection formed on said knockout pin adjacent the forward end thereof for producing a corresponding undercut in said plastic part, the angle of inclination of said opening being sufficient to effect disengagement of said knockout pin from said plastic part when said knockout pin block is moved to its release position.

2. The invention of claim 1 wherein said knockout pin is formed with a section of reduced cross-sectional area to increase the flexibility thereof.

3. The invention of claim 1 wherein said knockout pin has a plurality of transverse slots formed therein to increase the flexibility of said pin, said slots being located so that deformation of said knockout pin during a release operation will tend to close said slots.

4. The invention of claim 3 wherein said knockout pin is generally T-shaped in its cross-sectional configuration in the area of said transverse slots, said slots being formed in a rib member which comprises one leg element of said T-shaped configuration.

* * * * *